(12) United States Patent
Irwin et al.

(10) Patent No.: US 9,713,947 B2
(45) Date of Patent: Jul. 25, 2017

(54) VEHICLE RIDE-HEIGHT DETERMINATION FOR CONTROL OF VEHICLE AERODYNAMICS

(71) Applicant: GM GLOBAL TECHNOLOGY OPERATIONS LLC, Detroit, MI (US)

(72) Inventors: Kevin Irwin, Royal Oak, MI (US); Edward T. Heil, Howell, MI (US); Jason D. Fahland, Fenton, MI (US); Joshua R. Auden, Brighton, MI (US); Steven A. Opiteck, South Lyon, MI (US); David Dominguez, Tucson, AZ (US); Chris Morgan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/163,116

(22) Filed: May 24, 2016

(65) Prior Publication Data

US 2017/0080770 A1     Mar. 23, 2017

Related U.S. Application Data

(60) Provisional application No. 62/220,010, filed on Sep. 17, 2015.

(51) Int. Cl.
*B60G 17/0165*     (2006.01)
*B62D 35/00*     (2006.01)
*B62D 37/02*     (2006.01)

(52) U.S. Cl.
CPC ....... *B60G 17/0165* (2013.01); *B62D 35/005* (2013.01); *B62D 37/02* (2013.01);
(Continued)

(58) Field of Classification Search
CPC ............ B60G 17/0165; B60G 2401/21; B60G 2500/30; B60G 2401/15; B62D 35/005; B62D 37/02
See application file for complete search history.

(56) References Cited

U.S. PATENT DOCUMENTS

| | | | | |
|---|---|---|---|---|
| 4,810,022 A | * | 3/1989 | Takagi | B62D 35/005 180/197 |
| 5,593,176 A | * | 1/1997 | Campbell | B60G 11/26 280/124.102 |

(Continued)

*Primary Examiner* — Darlene P Condra
(74) *Attorney, Agent, or Firm* — Quinn IP Law

(57) ABSTRACT

A system is configured to control aerodynamics of a vehicle. The vehicle includes a vehicle body having a front end facing an ambient airflow when the vehicle is in motion relative to a road surface. The system includes an adjustable aerodynamic-aid element mounted to the vehicle body. The system also includes a mechanism configured to vary a position of the adjustable aerodynamic-aid element relative to the vehicle body and thereby control movement of the airflow. The system additionally includes a sensor configured to detect a height of the vehicle body relative to a predetermined reference frame and a controller configured to receive a signal from the sensor indicative of the detected vehicle body height. The controller is also configured to determine a ride-height of the vehicle using the detected vehicle body height and to regulate the mechanism in response to the determined ride-height to control aerodynamics of the vehicle.

18 Claims, 3 Drawing Sheets

(52) U.S. Cl.
CPC ...... *B60G 2401/15* (2013.01); *B60G 2401/21* (2013.01); *B60G 2500/30* (2013.01)

(56) References Cited

U.S. PATENT DOCUMENTS

| | | | | |
|---|---|---|---|---|
| 6,539,295 | B1 * | 3/2003 | Katzen | G01M 17/02 |
| | | | | 701/33.6 |
| 7,267,331 | B2 * | 9/2007 | Holbrook | B60G 17/0155 |
| | | | | 188/322.12 |
| 7,611,153 | B2 * | 11/2009 | Kim | B60G 17/0155 |
| | | | | 280/5.508 |
| 7,744,147 | B2 * | 6/2010 | Jeong | B62D 35/008 |
| | | | | 296/180.5 |
| 2005/0173945 | A1 * | 8/2005 | Frank | B62D 35/001 |
| | | | | 296/180.5 |
| 2010/0320704 | A1 * | 12/2010 | Kolp | B60G 17/016 |
| | | | | 280/5.514 |
| 2013/0238198 | A1 * | 9/2013 | Prentice | B62D 35/02 |
| | | | | 701/49 |
| 2014/0367930 | A1 * | 12/2014 | Zeweke | B60G 17/00 |
| | | | | 280/5.514 |
| 2015/0375592 | A1 * | 12/2015 | Lannen | B60G 17/016 |
| | | | | 701/37 |
| 2016/0082802 | A1 * | 3/2016 | Izak | B60G 17/08 |
| | | | | 280/6.157 |
| 2016/0229252 | A1 * | 8/2016 | Lu | B60G 17/0165 |

* cited by examiner

VEHICLE RIDE-HEIGHT DETERMINATION FOR CONTROL OF VEHICLE AERODYNAMICS

CROSS-REFERENCE TO RELATED APPLICATION(S)

This application claims the benefit of U.S. Provisional Application Ser. No. 62/220,010 filed Sep. 17, 2015, the entire contents of which is hereby incorporated by reference.

TECHNICAL FIELD

The disclosure relates to determination of motor vehicle ride-height for control of aerodynamics of the vehicle.

BACKGROUND

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds.

The study is typically used to shape vehicle bodywork along with employing dedicated aerodynamic devices for achieving a desired compromise among the above characteristics for specific vehicle use. Additionally, the study of aerodynamics may also be used to achieve downforce in vehicles in order to improve vehicle traction, high speed stability, and cornering.

SUMMARY

A system is disclosed for determining a ride-height of a vehicle and controlling aerodynamics thereof. The vehicle includes a vehicle body arranged along a longitudinal axis and having a first vehicle body end configured to face oncoming or incident ambient airflow when the vehicle is in motion relative to a road surface. The system includes an adjustable aerodynamic-aid element mounted to the vehicle body and configured to control aerodynamics of the vehicle. The system also includes a mechanism configured to vary a position of the adjustable aerodynamic-aid element relative to the vehicle body to thereby control a movement of the ambient airflow relative the vehicle body. The system additionally includes a sensor arranged on the vehicle and configured to detect a height of the vehicle body relative to a predetermined reference point. Furthermore, the system includes a controller configured to receive a signal from the sensor indicative of the detected height of the vehicle body relative to the predetermined reference point. The controller is also configured to determine a ride-height of the vehicle using the detected height of the vehicle body relative to the predetermined reference point and to regulate the mechanism in response to the determined ride-height of the vehicle to control the aerodynamics of the vehicle.

The vehicle may include a road wheel and a vehicle suspension corner operatively connecting the vehicle body to the road wheel. In such a case, a center of the road wheel may be used as the predetermined reference point.

The sensor can be arranged at the suspension corner and configured to detect the ride-height of the vehicle via sensing the height of the vehicle body relative to the center of the road wheel. Also, the controller can be configured to determine the ride-height of the vehicle using the sensed height of the vehicle body relative to the center of the road wheel.

The road wheel can include a pneumatic tire mounted thereon. The controller can be additionally configured to determine a deflection of the tire and to determine the ride-height of the vehicle using the determined deflection of the tire.

The controller can be programmed with a look-up table establishing a correlation between the detected height of the vehicle body relative to the road wheel and the deflection of the tire. The controller may be configured to determine the deflection of the tire using the look-up table.

The controller can be additionally configured to determine a pitch of the vehicle body along the longitudinal axis and to determine the ride-height of the vehicle using the determined pitch of the vehicle body.

The road surface can be used to define the predetermined reference point. In such a case, the sensor can be configured to detect the ride-height of the vehicle via directly sensing the height of the vehicle body relative to the road surface The sensor may be one of an ultrasonic sensor and a laser sensor.

The aerodynamic-aid element may be one of an adjustable spoiler, an air dam, a splitter, a diffuser, and shutter.

The vehicle may include a second vehicle body end positioned opposite the first body end. Accordingly, the regulation of the mechanism may be configured to vary a magnitude of the aerodynamic downforce generated by the aerodynamic-aid element on one of the first vehicle body end and the second vehicle body end.

The mechanism may include an actuator configured to vary the position of the aerodynamic-aid element relative to the vehicle body.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
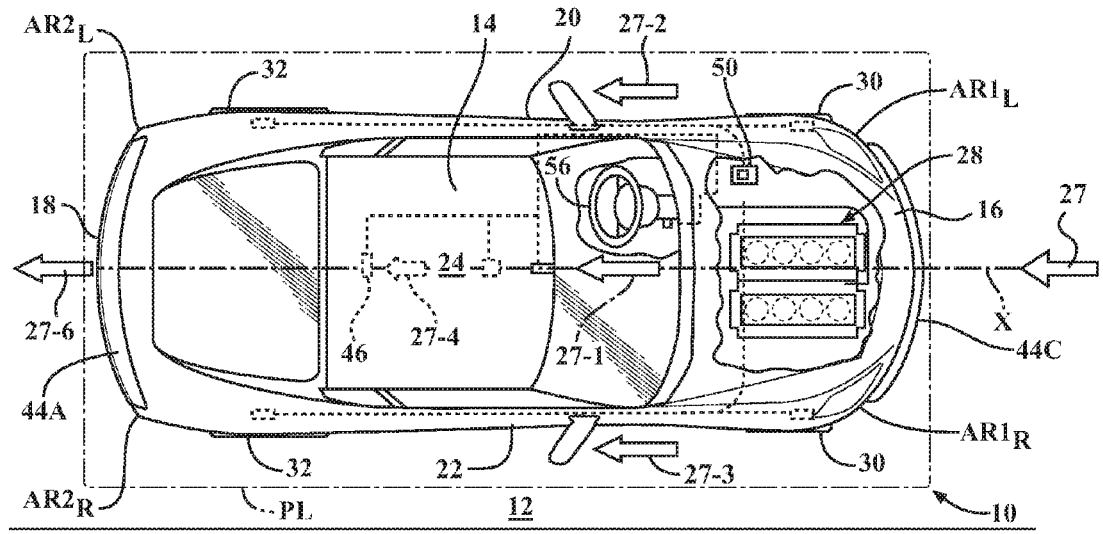
FIG. 1 is a schematic top view of a vehicle having vehicle body arranged in a body plane and along a longitudinal axis, and having a plurality of adjustable aerodynamic-aid elements and various sensors mounted to the vehicle body for vehicle ride-height determination according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a virtual longitudinal axis X in a body plane PL that is substantially parallel to the road surface 12 when the vehicle is stationary. The vehicle body 14 defines six body sides. The six body sides include a first body end or front end 16, a second body end or rear end 18 arranged opposite the front end, a first lateral body side or left side 20, and a second lateral body side or right side 22, a top body portion 24, which may include a vehicle roof, all shown in FIG. 1, and an underbody portion 26, shown in FIGS. 3 and 4.

The left side 20 and right side 22 are disposed generally parallel to each other and with respect to the longitudinal axis X, and span the distance between the front end 16 and the rear end 18. The body plane PL is defined to include the longitudinal axis X. A passenger compartment (not shown) of the vehicle 10 is generally bounded by the front and rear ends 16, 18 and the left and right sides 20, 22 of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane PL and along the longitudinal axis X.

As shown, the vehicle 10 also includes a powerplant 28, such as an internal combustion engine, a hybrid-electric powertrain (not shown), or other alternative types of propulsion systems. As the vehicle 10 moves relative to the road surface 12, for example under torque input from the powerplant 28, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in phantom in FIG. 1) passes under the vehicle body 14, between the underbody portion 26 and the road surface 12. As understood by those skilled in the art, the recirculating airflow region 27-6 is generally caused at elevated vehicle speeds by the flow of surrounding air around the six body sides of the vehicle body 14

Figure 2:
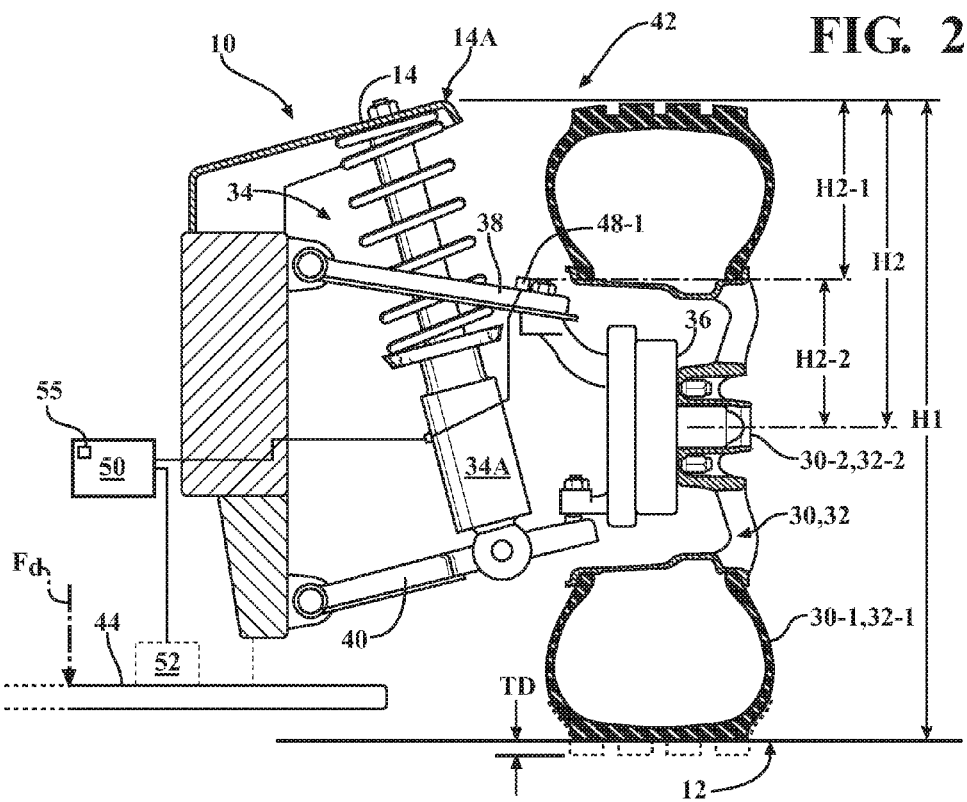
FIG. 2 is an enlarged schematic cross-sectional illustration of a representative suspension corner of the vehicle shown in FIG. 1, depicting different measurements of vehicle ride-height according to the disclosure.

The vehicle 10 also includes a plurality of road wheels that include front wheels 30 and rear wheels 32. As shown, each road wheel 30, 32 may have a pneumatic tire mounted thereon. Specifically, in the case of the four wheeled vehicle 10 shown, a pair of front wheels 30 arranged proximate the front end 16 and a pair of rear wheels 32 arranged proximate the rear end 18, include front tires 30-1 and rear tires 32-1 mounted on the respective front and rear wheels. Although four wheels, i.e., a pair of front wheels 30 and a pair of rear wheels 32, are shown in FIG. 1, a vehicle with fewer or greater number of wheels is also envisioned. As shown in FIG. 2, a vehicle suspension system 34 operatively connects the body 14 to the front and rear wheels 30, 32 for maintaining contact between the wheels and a road surface 12, and for maintaining handling of the vehicle. The suspension system 34 includes a plurality of knuckles 36, each configured to support a respective road wheel 30, 32 via a wheel hub 30-2, 32-2 and bearing assembly (not shown). As shown, each knuckle 36 may be operatively connected to the body 14 via an upper control arm 38 and a lower control arm 40. FIG. 2 depicts a representative corner 42 existing at each left and right front road wheel 30 and left and right rear road wheel 32 of the suspension system 34, each of which includes a representative knuckle 36, and may include each of the control arms 38 and 40. Other suspension designs employing individual corners at specific road wheels are known to those skilled in the art, and are also envisioned.

The vehicle 10 is typically characterized by a height of the vehicle body 14 relative to the road surface 12, typically termed as "vehicle ride-height". As can be seen in FIG. 2, in general, vehicle ride-height specifies a vertical position of the vehicle body 14 with respect to the road surface 12. The ride-height of the vehicle 10 can be determined via a number of distinct approaches, to be described in detail below. For example, as shown in FIG. 2, vehicle ride-height can be defined directly as a height H1 of the vehicle body 14 relative to the road surface 12. On the other hand, vehicle ride-height can be described as a height of the vehicle body 14 relative to a predetermined reference point. For example, the vehicle ride-height can be described as a height H2 of the vehicle body 14 relative to a particular road wheel 30, 32, which is then used to determine the height H1, as described in an exemplary embodiment below. For practical purposes, a center of the specific road wheel 30, 32 located on the respective wheel hub 30-2, 32-2 can be identified as the subject predetermined reference point. Therefore, the height H2 can be specified as a vertical distance between a set-point 14A on the vehicle body 14 and the respective wheel hub 30-2, 32-2 (shown in FIG. 2). A distance H2-1 from the upper control arm 38 to the set-point 14A on the vehicle body 14 can be detected via a chassis-position sensor, to be described in detail below. As a result, the height H2 can be determined as the sum of the detected distance H2-1 from the set-point 14A to the respective upper control arm 38 and a known distance H2-2 between the subject upper control arm and the respective wheel hub 30-2, 32-2. The height H2 can then be used to estimate, i.e., determine within a range of permissible error, the height H1 of the vehicle body 14 relative to the road surface 12. For illustrative purposes, in FIG. 2 the ride-height of the vehicle 10 is shown at the representative suspension corner 42 in terms of each, the height H1 and the height H2.

In order to determine the height H1 using the height H2, the specific height H2 can be further adjusted for a tire deflection TD (shown in phantom in FIG. 2) of each front pneumatic tire 30-1 and rear pneumatic tire 32-1 under load at any particular moment during operation of the vehicle 10. As understood by those skilled in the art, the ride-height of the vehicle 10 can change in response to various forces acting on the vehicle body 14. For example, the suspension system 34 can permit the vehicle body 14 to shift under acceleration, as well as under deceleration/braking maneuvers of the vehicle 10. To account for such dynamic changes in the ride-height of the vehicle 10 when the height H2 is used to determine the height H1, the ride-height estimation can be additionally adjusted for a pitch P (shown in FIG. 4) of the vehicle body 14 relative to the road surface 12 along the longitudinal axis X.

Figure 3:
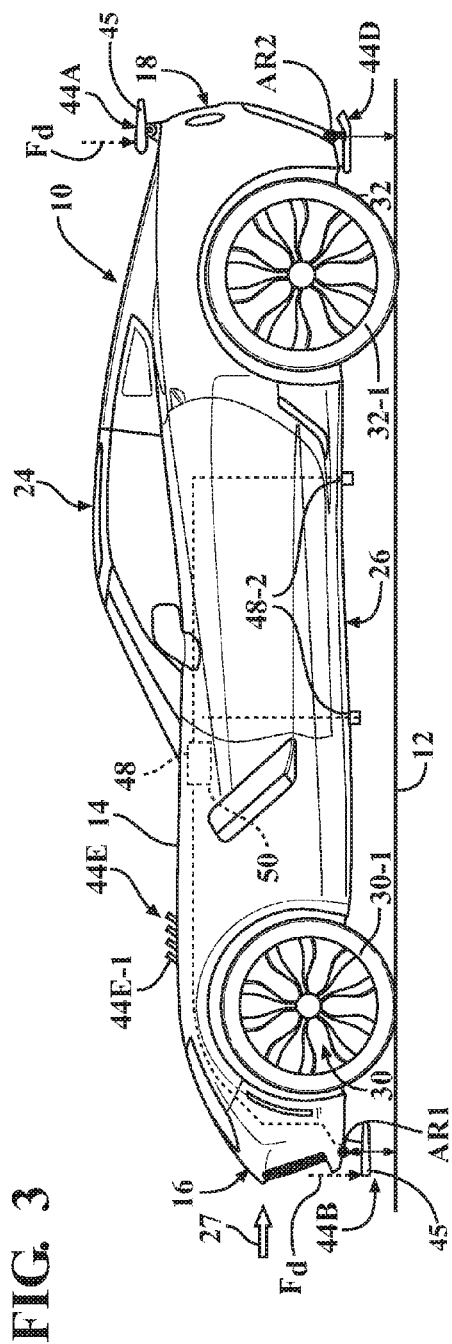
FIG. 3 is a schematic side view of the vehicle shown in FIG. 1 in level position according to the disclosure.
Figure 4:
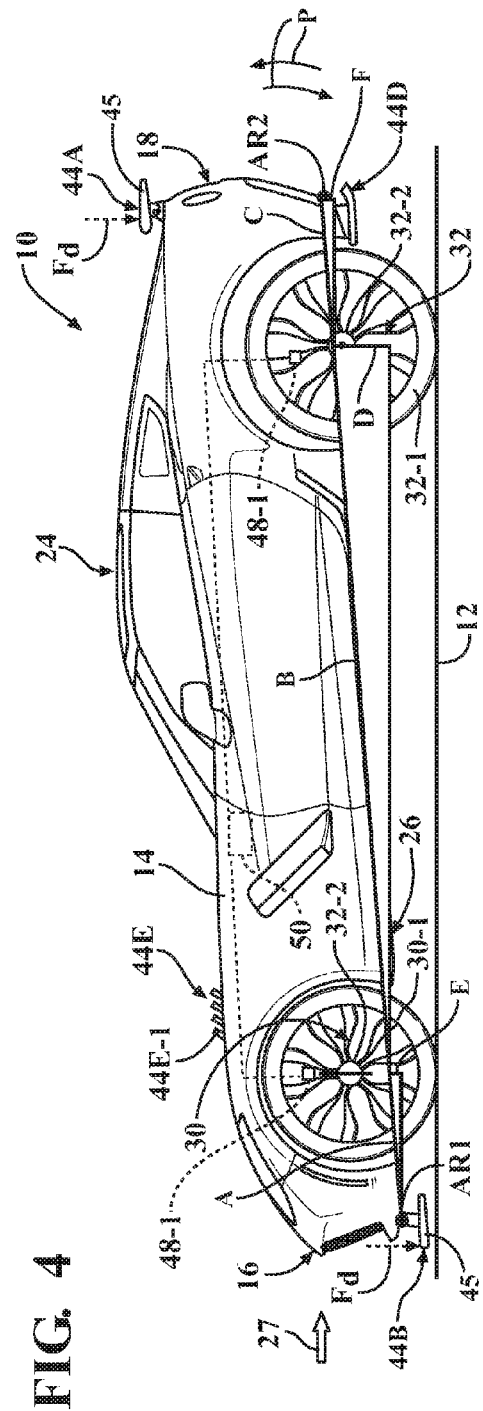
FIG. 4 is a schematic side view of the vehicle shown in FIG. 3, illustrating pitch directions according to the disclosure, and showing the vehicle in a specific pitched forward position during a braking event.

With reference to FIGS. 3 and 4, to determine the pitch P of the vehicle body 14, the vehicle 10 can have a first aerodynamic reference point AR1 established at the front end 16 and a second aerodynamic reference point AR2 established at the rear end 18. Respective heights of the first and second aerodynamic reference points AR1, AR2 can be determined in a static position of the vehicle 10 and cross-referenced to the height H1. Accordingly, changes in the first and second aerodynamic reference points AR1, AR2 during various vehicle maneuvers can be detected directly or estimated based on the determined respective heights H1 at the individual suspension corners 42. Additionally, to account for lateral g-loading encountered by the vehicle 10 during cornering, the first aerodynamic reference point AR1 can be further discretized into a left front reference point $AR1_L$ and a right front reference point $AR1_R$ (as shown in FIG. 1), while the second aerodynamic reference point AR2 can be further discretized into a left rear reference point $AR2_L$ and right rear reference points $AR2_R$ (shown in FIG. 1). Hence, the ride-height estimation can also be adjusted for a roll R (shown in FIG. 5) of the vehicle body 14 relative to the road surface 12, which generally occurs about the longitudinal axis X. Specifically, the difference in height between the left first aerodynamic reference point $AR1_L$ and the right first aerodynamic reference point $AR1_R$, as well as a difference in height between the left second aerodynamic reference point $AR2_L$ and right second aerodynamic reference point $AR2_R$, can be used to determine a degree of roll R of the vehicle 10 relative to the road surface 12.

The vehicle 10 also includes an adjustable aerodynamic-aid element generically shown and identified via a numeral 44 in FIG. 2. The adjustable aerodynamic-aid element 44 is mounted to the vehicle body 14. The adjustable aerodynamic-aid element 44 can, for example, take the form of a spoiler 44A (shown in FIGS. 1, 3, and 4), an air dam 44B (shown in FIGS. 3 and 4), a splitter 44C (shown in FIG. 5), a diffuser 44D (shown in FIGS. 3 and 4), or a shutter 44E (shown in FIGS. 3, 4, and 5) having moveable louvers 44E-1 that can be shifted between opened and closed positions, as well as a specialized wing, an airfoil, or a diveplane (none of which are shown by can be envisioned by those skilled in the art). As such, a particular adjustable aerodynamic-aid element 44 can be positioned either on the front end 16 or the rear end 18 of the vehicle 10. The aerodynamic-aid element 44 can be adjusted relative to the vehicle body 14 via an electric motor or another type of an actuator, as will be described in more detail below. As shown, the vehicle 10 also includes one or more height sensors arranged on the vehicle body 14 and configured to determine the ride-height of the vehicle.

An embodiment of the height sensor can be a chassis-position sensor 48-1 arranged at the suspension corner 42 on the upper control arm 38 (as shown in FIGS. 2 and 4) and configured to sense the height of the vehicle body 14 relative to the center of the representative road wheel 30, 32 for determining the ride-height of the vehicle 10. Such an arrangement of the chassis-position sensor 48-1 on the upper control arm 38 would enable detection of the change in position of the road wheel 30, 32 relative to some predetermined fixed point on the vehicle body 14. Another embodiment of the height sensor can be a sensor 48-2 (shown in FIG. 3) configured to detect the ride-height of the vehicle 10 via directly sensing the height of the vehicle body 14 relative to the road surface 12. The sensor 48-2 can, for example, be either an ultrasonic sensor or a laser sensor. Additionally, an accelerometer 46 can be mounted on the vehicle 10 to detect acceleration and braking of the vehicle.

The vehicle 10 additionally includes a controller 50 configured or programmed to receive a signal from the accelerometer 46 and the sensor(s) 48-1 or 48-2 indicative of the detected ride-height of the vehicle. The controller 50 is also configured to determine the ride-height of the vehicle 10 using the detected height of the vehicle body 14 relative to the specific reference point, such as the center of the respective road wheel 30, 32 or the road surface 12, as discussed above. In the case where the sensor(s) 48-1 senses the height of the vehicle body 14 relative to the representative road wheel 30, 32, the controller 50 can be programmed to determine the ride-height of the vehicle using the sensed height of the vehicle body relative to the respective wheel hub 30-2, 32-2. The controller 50 is additionally configured to regulate a position of the adjustable aerodynamic-aid element 44 in response to the determined height of the vehicle body 14 relative to the road surface 12. Such regulation of position of the adjustable aerodynamic-aid element 44 is intended to generally control the aerodynamics of the vehicle 10, and specifically a downforce $F_d$ (shown in FIGS. 2, 4, and 5) on the vehicle body 14.

Figure 5:
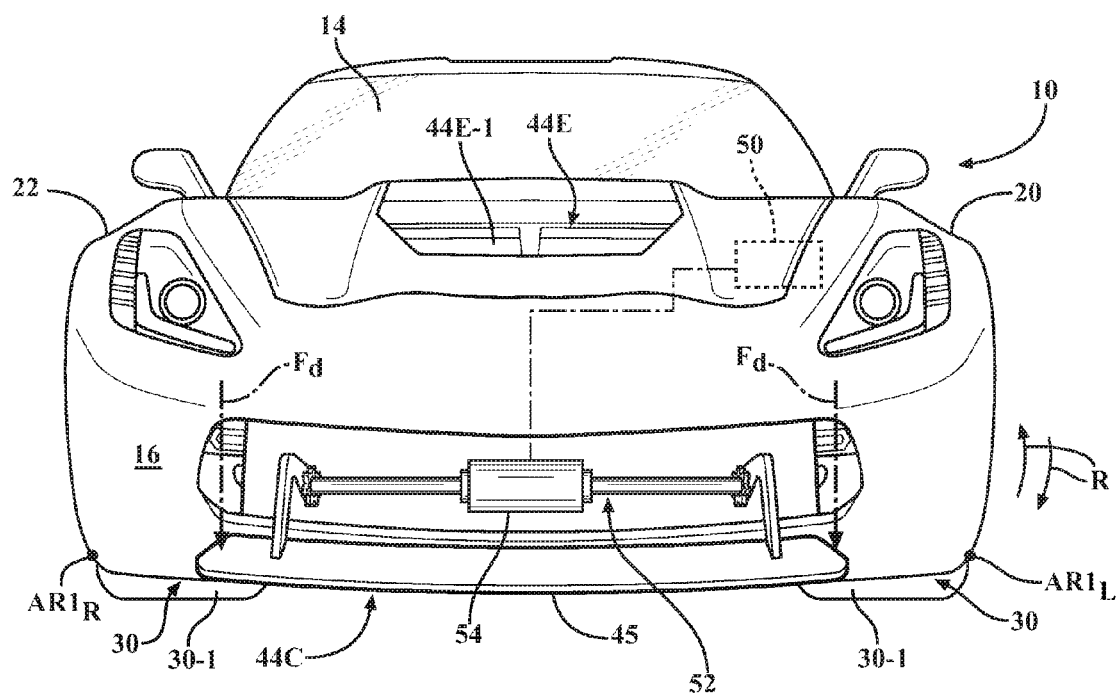
FIG. 5 is a schematic front view of the vehicle shown in FIG. 1, illustrating vehicle roll directions during cornering events according to the disclosure.

As shown in FIGS. 3 and 4, at least the embodiments 44A and 44B of the adjustable aerodynamic-aid element 44 may have a specifically shaped element body 45 arranged generally perpendicular to the longitudinal axis X. More particularly, the element body 45 may be wing-shaped. "Wing-shaped" is herein defined as having a shape of a wing, i.e., a fin having a shape of an airfoil. In a side or cross-sectional view of the element body 45, as seen in a side view of the vehicle 10 shown in FIGS. 3 and 4, the subject airfoil is defined by a streamlined shape producing lift for flight or propulsion through a fluid. As shown in FIGS. 2 and 5, a mechanism 52 is configured to vary a position of the element body 45 relative to the vehicle body 14 to thereby control a movement of the ambient airflow 27 relative the vehicle 10.

The mechanism 52 may include one or more actuators 54 configured to vary the position of the element body 45 relative to the vehicle body 14. Such an actuator 54 can be electric, mechanical, electro-mechanical, pneumatic, or any other type appropriate for the specific packaging, efficiency, and cost constraints applicable to the usage of specific aerodynamic-aid elements 44. The controller 50 is also programmed to regulate the mechanism 52 for whichever embodiments of the adjustable aerodynamic-aid element 44 employed by the vehicle 10, and thereby vary, i.e., selectively increase or decrease, a magnitude of the downforce $F_d$ acting on either the front end 16 or the rear end 18 of the vehicle.

The controller 50 may be configured as a central processing unit (CPU) configured to regulate operation of the powerplant 28, as well as other vehicle systems, or a dedicated controller. The controller 50 may be configured to vary an angle θ (shown in FIG. 4) of the element body 45 with respect to the road surface 12 via the mechanism 52 in response to the signal received from the sensor(s) 48-1 or 48-2 indicative of the ride-height of the vehicle 10. In order to appropriately control operation of the mechanism 52, the controller 50 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 50 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 50 may also include a floppy disk, a flexible disk, hard disk, magnetic tape, any other magnetic medium, a CD-ROM, DVD, any other optical medium, etc. The controller 50 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 50 or accessible thereby may be stored in the respective memory and automatically executed to provide the required functionality.

The controller 50 may be programmed with a look-up table 55 (shown in FIG. 2) establishing a correlation between the detected height H2 of the vehicle body 14 relative to the particular road wheel 30, 32 and the deflection TD of the respective pneumatic tire 30-1, 32-1. Such a correlation can, for example, be based on previously recorded heights H2, for example, a measured position of the upper control arm 38, at various known loads on the vehicle 10. The controller 50 can thereby be enabled to determine the deflection TD of each front pneumatic tire 30-1 and rear pneumatic tire 32-1 using the look-up table 55. As previously noted, the vehicle body 14 is characterized by a specific height H1 relative to the road surface 12. Additionally, as can be seen from the exemplary embodiment shown in FIG. 2, the height H1 can be approximated by the sum of the height H2 of the vehicle body 14 relative to the upper control arm 38, the known combined unloaded diameter of the particular wheel 30, 32 and the respective pneumatic tire 30-1, 32-1, and the tire deflection TD. Accordingly, the controller 50 can be additionally configured to determine the height H1 using the determined deflection TD of the particular tire 30-1, 30-2.

The controller 50 can also be configured to determine the pitch P of the vehicle body 14 under acceleration and under deceleration/braking of the vehicle 10. To account for such dynamic changes in the ride-height of the vehicle 10 when the height H2 is used to determine the height H1, the ride-height estimation can be additionally adjusted or compensated for the pitch P of the vehicle body 14 along the longitudinal axis X. To determine the pitch P of the vehicle body 14, the controller 50 can be configured to receive signals from the chassis-position sensor(s) 48-1 or the direct measurement sensor(s) 48-2 for the first aerodynamic reference point AR1 at the front end 16 and the second aerodynamic reference point AR2 established at the rear end 18. Hence, the controller 50 can then be enabled to either estimate or determine directly the individual ride-height at the front end 16 and the rear end 18 of the vehicle 10. As noted above, acceleration and braking of the vehicle 10 can be detected via the accelerometer 46 and a signal indicative of such can be communicated to the controller 50. The accelerometer 46 signal can be processed via the controller 50 for correlation with the determined pitch P to establish current ride-height of the vehicle 10.

With reference to FIGS. 3 and 4, the Similar Triangles method from Geometry can be employed to estimate Pitch P and roll R. Specifically, the Similar Triangles method can be used to estimate the change in height of the front and rear aerodynamic reference points AR1, AR2 due to pitch P, and also to output the difference between the left first aerodynamic reference point $AR1_L$ and the right first aerodynamic reference point $AR1_R$ and the difference in height between the left and right aerodynamic reference points $AR2_R$, $AR2_L$ due to roll R.

| Dimension designated in FIG. 4 | Definition |
| --- | --- |
| A | Distance from the front aerodynamic reference point AR1 to the front wheel hub 30-2 |
| B | Distance between the front wheel hub 30-2 and the rear wheel hub 32-2 (wheelbase of the vehicle 10) |
| C | Distance from rear aerodynamic reference point to the rear wheel hub 32-2 |
| D | Rear wheel hub 32-2 height − Front wheel hub 30-2 height |
| E | $(D) * \left(\dfrac{A}{B}\right)$ |
| F | $(D) * \left(\dfrac{C}{B}\right)$ |

Therefore, the estimated ride-heights at each aerodynamic reference point $AR1_L$, $AR1_R$, $AR2_R$, and $AR2_L$ can be calculated using the following equations:

Ride-height at AR1=(Height at front wheel hub 30-2)−*E*

Ride-height at AR2=(Height at rear wheel hub 32-2)+*F*

$$\text{Vehicle Pitch } P = \arcsin\left(\frac{D}{B}\right)$$

The controller 50 can also be configured to determine the roll R of the vehicle body 14 encountered by the vehicle 10 during cornering. To determine the degree of roll R, the controller 50 can be configured to receive and compare signals from the chassis-position sensor(s) 48-1 or the direct measurement sensor(s) 48-2, at the left front reference point $AR1_L$, the right front reference point $AR1_R$, the left rear reference point $AR2_L$, and the right rear reference point $AR2_R$. Hence, the controller 50 can either estimate or determine directly the ride-height at the left side 20 and the right side 22 of the vehicle 10 to account for the roll R of the vehicle body 14. Specifically, the difference in height between the left first aerodynamic reference point $AR1_L$ and the right first aerodynamic reference point $AR1_R$ and a difference in height between the left and right aerodynamic reference points $AR2_R$, $AR2_L$ can be used to determine a degree of roll R of the vehicle body 14.

For example, at the front end 16, roll can be represented by the following expression:

$AR1_L$ height(with tire deflection TD)−$AR1_R$ height (with tire deflection TD)

Accordingly, at the front end 16 the vehicle roll R in degrees can be determined via the following equation:

$$\text{Vehicle Roll } R = \arcsin\left(\frac{AR1R \text{ height with } TD - AR1L \text{ height with } TD}{\text{Distance between } AR1R \text{ and } AR1L}\right)$$

The vehicle 10 can also include a plurality of sensors for detecting rotating speeds of each road wheels 30, 32 and the detected rotating speed of the respective road wheel to the controller 50. The vehicle 10 can additionally include sensors configured to detect a yaw moment or rate on the vehicle body 14 relative to the road surface 12 and communicate the detected yaw rate to the controller 50. The vehicle 10 can include a sensor operatively connected to a steering wheel 56 (shown in FIG. 1) and configured to detect an angle of the steering wheel during operation of the vehicle. An intended direction of the vehicle 10 may be identified by the steering wheel angle detected by such a sensor and communicated to the controller 50. A yet another sensor can be used to detect a velocity of ambient airflow 27 relative to the vehicle 10. The fourth sensor may be additionally configured to communicate the detected velocity of the ambient airflow 27 to the controller 50 for correlation of the airflow velocity to the road speed of the vehicle 10.

The controller 50 can be programmed to regulate the mechanism 52 in response to signals from the various sensors and the determined ride-height of the vehicle body 14. Accordingly, position of the element body 45 of each individual aerodynamic-aid element 44 can be regulated by the controller 50 to thereby control movement of the ambient airflow 27 relative to the vehicle 10. As the angle θ of the element body 45 of the particular aerodynamic-aid element 44 is varied during acceleration, braking, and/or cornering events, the aerodynamic-aid element positioned either at the front end 16, the rear end 18, or elsewhere on the vehicle body 14, is able to utilize the ambient airflow 27 for controlling the downforce $F_d$ on the vehicle body 14. Such control of the downforce $F_d$, in turn, affects dynamic behavior and enhances stability of the vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A system for controlling aerodynamics of a vehicle, wherein the vehicle includes a vehicle body arranged along a longitudinal axis and having a first vehicle body end configured to face oncoming ambient airflow when the vehicle is in motion relative to a road surface, the system comprising:
   an adjustable aerodynamic-aid element mounted to the vehicle body;
   a mechanism configured to vary a position of the adjustable aerodynamic-aid element relative to the vehicle body to thereby control a movement of the ambient airflow relative the vehicle body;
   a sensor arranged on the vehicle and configured to detect a height of the vehicle body relative to a predetermined reference point; and
   a controller configured to:
      receive a signal from the sensor indicative of the detected height of the vehicle body relative to the predetermined reference point;
      determine a pitch of the vehicle body along the longitudinal axis;
      determine a ride-height of the vehicle using the detected height of the vehicle body relative to the predetermined reference point and the determined pitch of the vehicle body; and
      regulate the mechanism in response to the ride-height of the vehicle to control the aerodynamics of the vehicle.

2. The system according to claim 1, wherein the vehicle includes a road wheel and a vehicle suspension corner operatively connecting the vehicle body to the road wheel, and wherein a center of the road wheel is used as the predetermined reference point.

3. The system according to claim 2, wherein the sensor is arranged at the suspension corner and configured to detect the ride-height of the vehicle via sensing the height of the vehicle body relative to the center of the road wheel, and wherein the controller is configured to determine the ride-height of the vehicle using the sensed height of the vehicle body relative to the center of the road wheel.

4. The system according to claim 3, wherein the road wheel includes a pneumatic tire mounted thereon, and wherein the controller is additionally configured to determine a deflection of the tire and to determine the ride-height of the vehicle using the determined deflection of the tire.

5. The system according to claim 4, wherein the controller is programmed with a look-up table establishing a correlation between the detected height of the vehicle body relative to the road wheel and the deflection of the tire, and wherein the controller is configured to determine the deflection of the tire using the look-up table.

6. The system according to claim 1, wherein the road surface is used as the predetermined reference point, and wherein the sensor is configured to detect the ride-height of the vehicle via directly sensing the height of the vehicle body relative to the road surface.

7. The system according to claim 6, wherein the sensor is one of an ultrasonic sensor and a laser sensor.

8. The system according to claim 1, wherein the aerodynamic-aid element is one of an adjustable spoiler, an air dam, a splitter, a diffuser, and shutter.

9. The system according to claim 1, wherein the vehicle includes a second vehicle body end positioned opposite the first body end, and wherein the regulation of the mechanism is configured to vary a magnitude of the aerodynamic downforce generated by the aerodynamic-aid element on one of the first vehicle body end and the second vehicle body end.

10. A vehicle comprising:
   a vehicle body arranged along a longitudinal axis and having a first vehicle body end configured to face oncoming ambient airflow when the vehicle is in motion relative to a road surface;
   an adjustable aerodynamic-aid element mounted to the vehicle body;
   a mechanism configured to vary a position of the adjustable aerodynamic-aid element relative to the vehicle body to thereby control a movement of the ambient airflow relative the vehicle body;
   a sensor arranged on the vehicle and configured to detect a height of the vehicle body relative to a predetermined reference point; and
   a controller configured to:
      receive a signal from the sensor indicative of the detected height of the vehicle body relative to the predetermined reference point;
      determine a pitch of the vehicle body along the longitudinal axis;

determine a ride-height of the vehicle using the detected height of the vehicle body relative to the predetermined reference point and the determined pitch of the vehicle body; and regulate the mechanism in response to the determined ride-height of the vehicle to control aerodynamics of the vehicle.

11. The vehicle according to claim 10, further comprising a road wheel and a vehicle suspension corner operatively connecting the vehicle body to the road wheel, and wherein a center of the road wheel is used as the predetermined reference point.

12. The vehicle according to claim 11, wherein the sensor is arranged at the suspension corner and configured to detect the ride-height of the vehicle via sensing the height of the vehicle body relative to the center of the road wheel, and wherein the controller is configured to determine the ride-height of the vehicle using the sensed height of the vehicle body relative to the center of the road wheel.

13. The vehicle according to claim 12, wherein the road wheel includes a pneumatic tire mounted thereon, and wherein the controller is additionally configured to determine a deflection of the tire and to determine the ride-height of the vehicle using the determined deflection of the tire.

14. The vehicle according to claim 13, wherein the controller is programmed with a look-up table establishing a correlation between the detected height of the vehicle body relative to the road wheel and the deflection of the tire, and wherein the controller is configured to determine the deflection of the tire using the look-up table.

15. The vehicle according to claim 10, wherein the road surface is used as the predetermined reference point, and wherein the sensor is configured to detect the ride-height of the vehicle via directly sensing the height of the vehicle body relative to the road surface.

16. The system according to claim 15, wherein the sensor is one of an ultrasonic sensor and a laser sensor.

17. The vehicle according to claim 10, wherein the aerodynamic-aid element is one of an adjustable spoiler, an air dam, a splitter, a diffuser, and shutter.

18. The vehicle according to claim 10, further comprising a second vehicle body end positioned opposite the first body end, wherein the regulation of the mechanism is configured to vary a magnitude of the aerodynamic downforce generated by the aerodynamic-aid element on one of the first vehicle body end and the second vehicle body end.

* * * * *